United States Patent [19]

Nakamura

[11] Patent Number: 4,982,323
[45] Date of Patent: Jan. 1, 1991

[54] INFORMATION PROCESSING SYSTEM FOR SETTING OPERATIONAL FUNCTIONS OF A TERMINAL UNIT

[75] Inventor: Takashi Nakamura, Toride, Japan
[73] Assignee: Hitachi Maxell, Ltd., Osaka, Japan
[21] Appl. No.: 203,448
[22] Filed: Jun. 7, 1988

[30] Foreign Application Priority Data

Jun., 1987 [JP] Japan .................................. 62-143817
Jun. 9, 1987 [JP] Japan .................................. 62-143818

[51] Int. Cl.⁵ .......................... G07F 7/08; G06K 5/00; G06F 13/00
[52] U.S. Cl. ............................. 364/200; 364/900; 364/251.5; 364/254.6; 364/283.4; 364/963.3; 364/974.4; 235/379; 235/380
[58] Field of Search ................ 364/200, 900; 235/380, 235/379, 492

[56] References Cited

U.S. PATENT DOCUMENTS

| | | | |
|---|---|---|---|
| 3,955,180 | 5/1976 | Hirtle | 364/200 |
| 4,752,677 | 6/1988 | Nakano et al. | 235/380 |
| 4,757,185 | 7/1988 | Onishi | 235/380 |
| 4,771,460 | 9/1988 | Tamada et al. | 235/380 |
| 4,774,513 | 9/1988 | Bonnaval-LaMotta et al. | 235/380 |
| 4,787,030 | 11/1988 | Harter et al. | 364/200 |
| 4,827,512 | 5/1989 | Hirokawa et al. | 380/23 |

FOREIGN PATENT DOCUMENTS 0190733  8/1986  European Pat. Off. .
2045487  10/1980  United Kingdom .

Primary Examiner—Michael R. Fleming
Assistant Examiner—Gopal C. Ray
Attorney, Agent, or Firm—Antonelli, Terry, Stout & Kraus

[57] ABSTRACT

An information processing system including a 2-dimensional table having fields corresponding to input or output devices, fields corresponding to data items, and information recording areas at intersections of the fields, and a processing program having instructions prepared in correspondence to the input or output devices, the intersecting recording areas recording relational information which links each input or output device with the data items, one of the instructions making access to a corresponding device field to obtain relational information which specifies one or more data items pertinent to the device, so that the processing program implements processing on the data item(s) for the input or output device.

10 Claims, 3 Drawing Sheets

INFORMATION PROCESSING SYSTEM FOR SETTING OPERATIONAL FUNCTIONS OF A TERMINAL UNIT

BACKGROUND OF THE INVENTION

This invention relates to an information processing system and, particularly, to an information processing system which enables a terminal unit incorporating an IC card reader to add operational functions afterward depending on the user-dependent specifications.

IC cards have been used in a variety of financial firm's cards and membership cards, and are now going to be used as credit cards for various commodity transactions and ticket buying cards for public transportations. IC cards are used in extensive fields, and each kind of IC card has a distinct content of data and manner of processing depending on each issuing company. On this account, processing programs are prepared separately for terminal units or host computers (they are called generically "terminal units" hereinafter) which deal with specific IC cards.

There have been proposed IC cards oriented to "down-load processing" in which processing programs corresponding to a terminal unit for a specific business, such as banks, is written afterward on the IC card. Terminal units which accept IC cards are designed to process data in correspondence to each type of IC card.

IC cards are used increasingly in a variety of content, and therefore it is extremely inefficient to provide terminal units specifically in compliance with individual specifications. Their hardware structures are almost same or similar to one another, and individual specifications are mainly attained on a software basis. Development of software to meet individual specifications of terminal units results in a higher manufacturing cost and longer delivery time.

SUMMARY OF THE INVENTION

This invention is intended to solve the foregoing problems, and its prime object is to provide an information processing system which enables a plurality of types of terminal units to have their input/output data processing functions set up selectively in compliance with the given specifications.

The invention is based on the fact that input/output devices connected with a variety of terminal units are almost identical, and is designed to separate input/output devices from input/output data items and process information so that data processing functions which meet individual specifications which are attained by merely specifying an input/output device in the processing program.

In order to achieve the above objective, the inventive system includes a 2-dimensional memory table having fields of input or output devices and fields of data items that are the object of input or output, with intersections of columns and rows of the fields forming information recording areas, and a processing program including instructions provided in correspondence to the input or output devices. Each information recording area has a record of relational information which links an input or output device to a data item, and an instruction corresponding to an input or output device is designated to make access to the relevant device field so that information of data items pertinent to the device is accessed by the processing program.

As mentioned above, input/output devices and data items are arranged independently for input/output data processing, and information which links the data item field and device field is written in the intersecting area of the 2-dimensional record table, so that an instruction issued in correspondence to an input/output device, independent of data items, enables the processing program to access data items in the data item fields pertinent to the device.

Consequently, processing programs can be prepared on the device level, instead of being dependent on individual data items, and the programs can be made versatility adaptive by merely rewriting the record table or relational information, without the need of significant alteration of program or without any change at all. Accordingly, processing functions for various specifications can be realized by merely setting the relation between the device fields and data item fields in the record table, and the content of data processing can readily be established. This allows the standardization of software, while enabling terminal units to have processing functions complying with individual specifications.

DESCRIPTION OF THE PREFERRED EMBODIMENTS

An embodiment of this invention will be described in detail with reference to the drawings.

Figure 1:
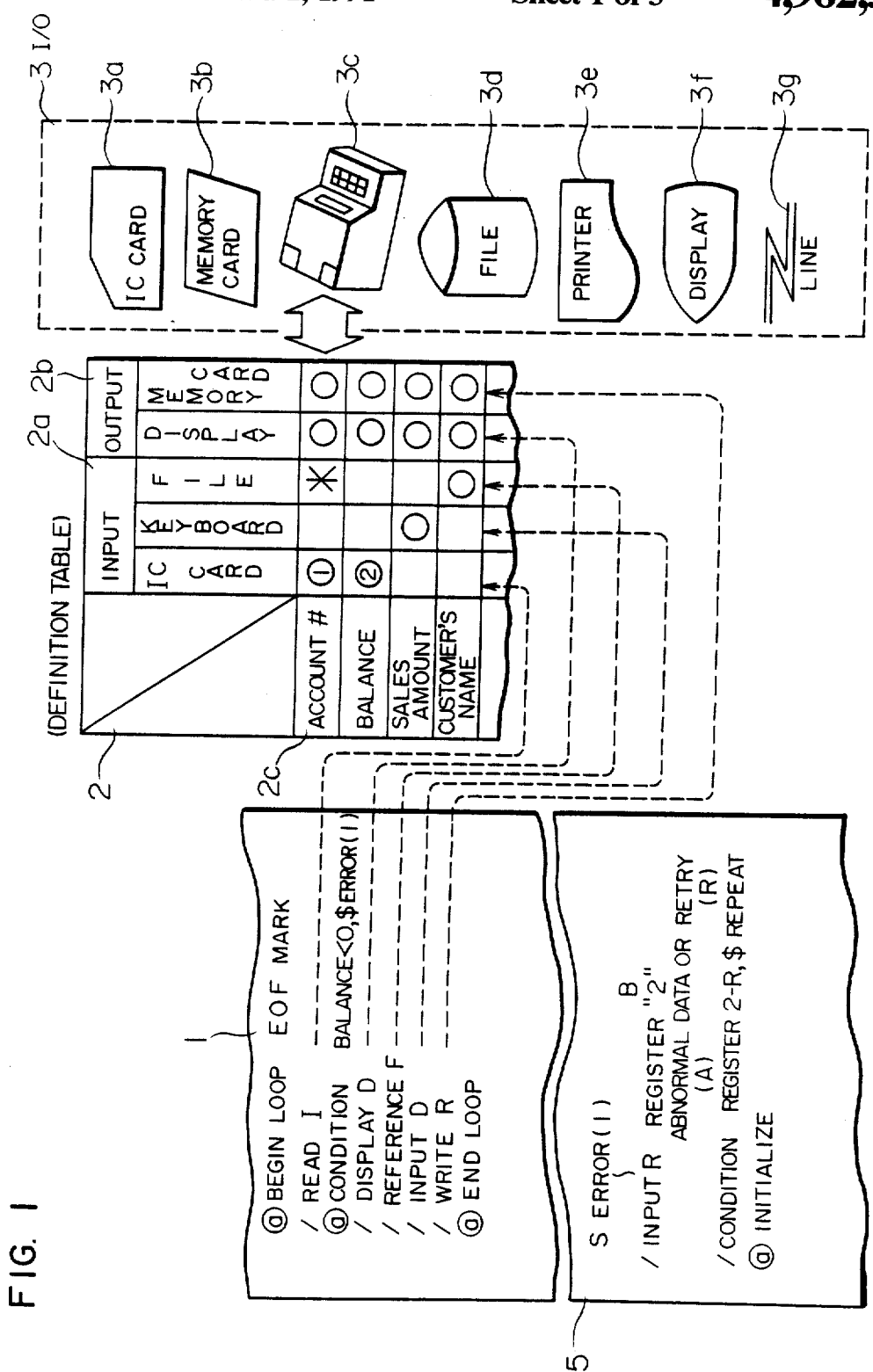
FIG. 1 is a conceptual diagram explaining the IC card terminal unit to which an embodiment of the inventive information processing system is applied.
Figure 2:
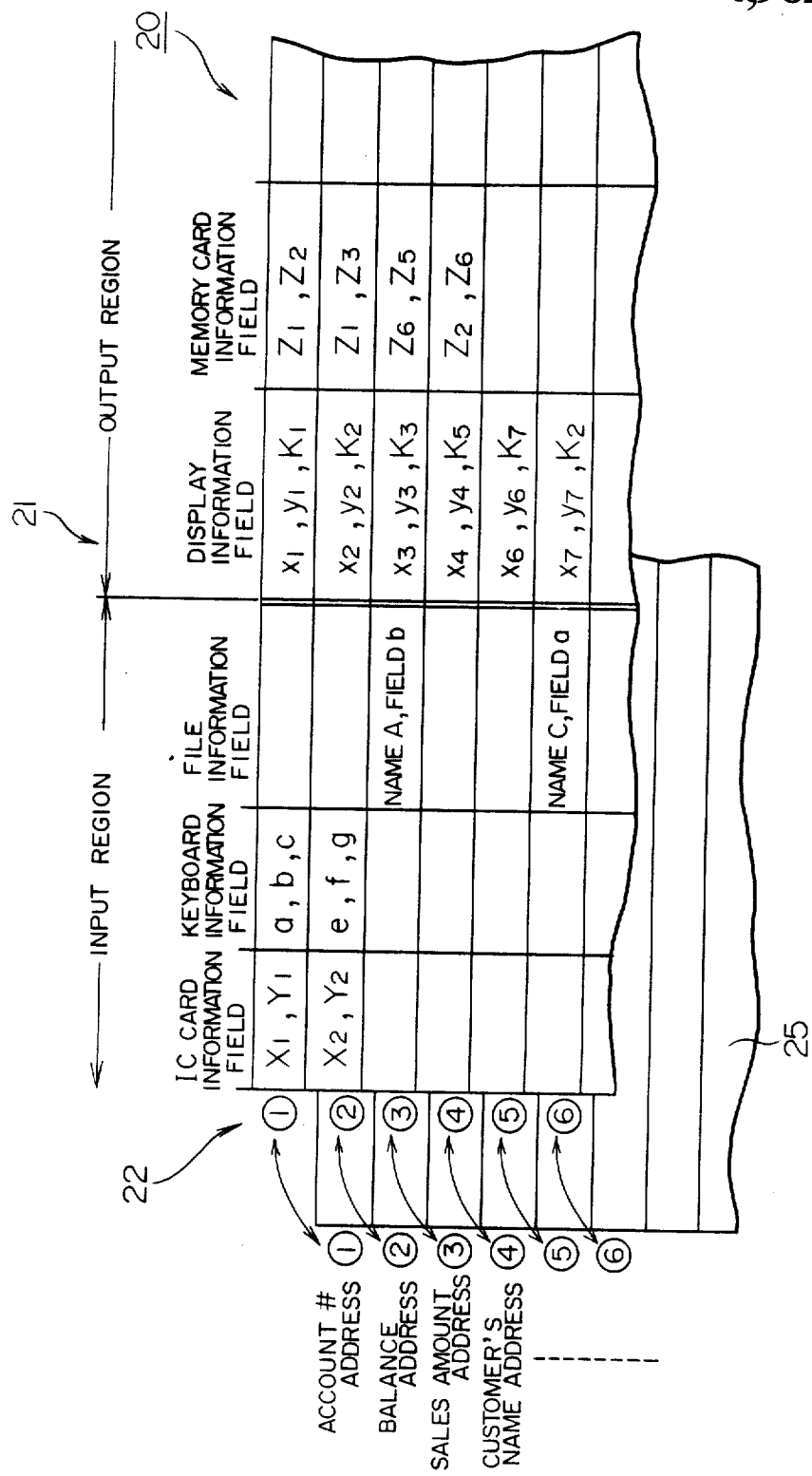
FIG. 2 is a diagram explaining the record table according to another embodiment of the invention.
Figure 3:
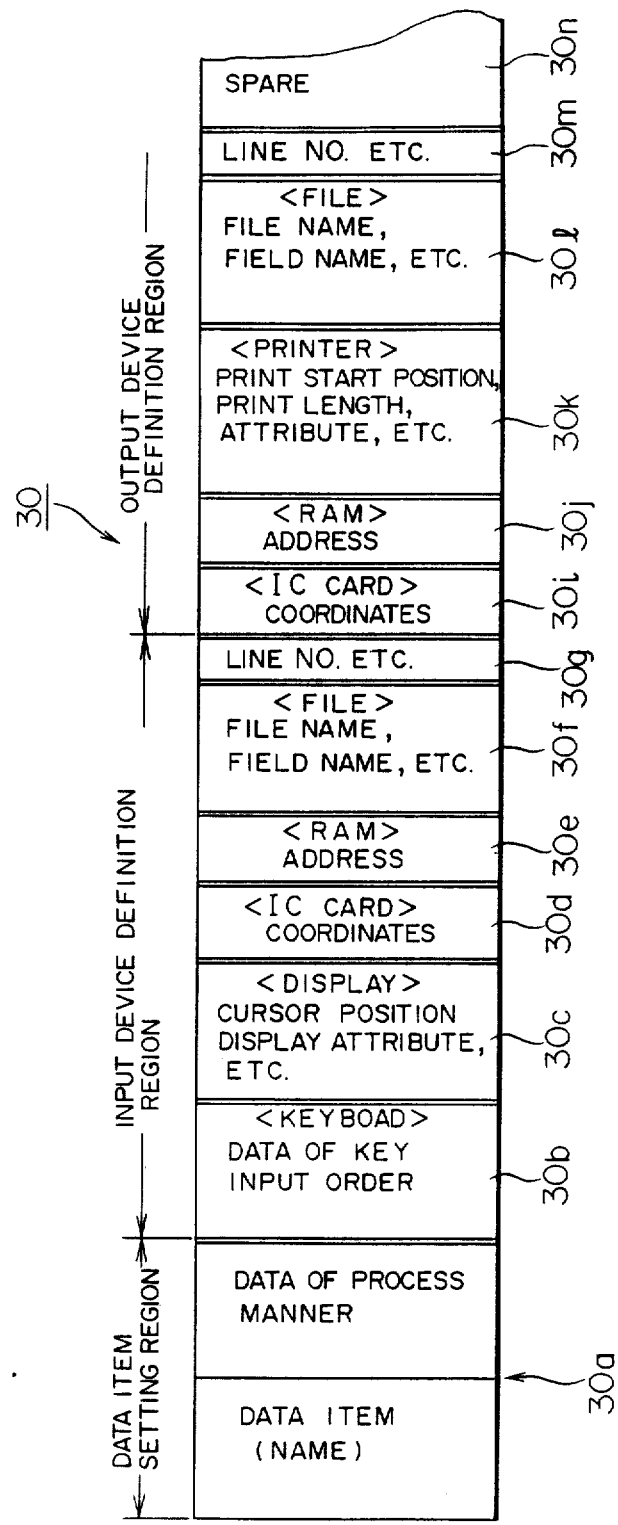
FIG. 3 is a diagram showing a specific structure of the definition table.

FIG. 1 is a conceptual diagram explaining the IC card terminal unit to which an embodiment of the inventive information processing system is applied, FIG. 2 is a diagram explaining the recording table according to another embodiment of the invention, and FIG. 3 is a diagram showing a specific structure of the definition table.

In FIG. 1, indicated by 1 is a processing program executed by a processor incorporated in the IC card terminal unit, and 2 is a definition table stored in the memory for the processor and provided with data item fields accessed by the processor in accordance with instructions of the processing program 1. Indicated by 3 is a group of input/output devices, with which the processor exchanges information through an interface, including an IC card 3a, memory card 3b, small terminal unit 3c having a keyboard, file 3d in an external storage, printer 3e, display unit 3f, and line 3g used for information exchange with other host computers or the like through a modem.

The processing program 1 has each instruction formatted to designate one of input/output devices in the definition table 2 directly or in the operand. For example, an instruction "Read I" makes access to the column of IC card in the definition table 2 and searches the column vertically for a data item by making reference to the relational information (will be explained shortly), and prompts the system to read the contents of the data item. The definition table 2 is a 2-dimensional record table with a horizontal arrangement of an input device region 2a including columns of IC card 3a, small keyboard terminal 3c and file storage 3d connected to the terminal unit, and an output device region 2b including columns of display unit 3g and memory card 3a connected to the terminal unit. These devices are examples among commonly used ones, and various other input/output devices can be added in the regions 2a and 2b. When one particular device is used for both input and output, it is given columns in both input device region and output device region.

The definition table 2 has a vertical arrangement of data item fields 2c including rows of account number (account #), balance, amount of sales, card holder's name, and so on provided consistently with items dealt with by the input/output devices, i.e., IC card 3a, small keyboard terminal 3c, file storage 3d, display unit 3f, memory card 3b, etc.

The definition table 2 has intersecting areas to form a matrix of device fields and data item fields, in which marks "o" are written to link both fields depending on the specifications. For example, if the IC card 3 includes information of account number, the intersecting area met by the IC card column and the account number row is marked. In the illustrated case, the IC card 3a has a record of account number and balance, but does not have a record of card holder's name, while the small keyboard terminal 3c includes a record of sales amount. The definition table 2 further states that the display unit 3f and memory card 3b are both designed to output the account number, balance, sales amount, and customer's name. Data items in the IC card column with numbers indicated in the symbol "o" are arranged in the ascending order of the number, while items without numbers are ordered as arranged in the definition table 2. The symbol "o" carries the relational information for linking an input/output device to a pertinent data item. Although the information is depicted as the symbol "o", it is actually represented by several bits of data. For example, the first bit is a flag indicating correspondingly the presence or absence of the symbol "o", e.g., bit "1" for "o", and following bits indicate the order of arrangement. If the system needs only the connection with a data item, the flag does not need other special information.

Next, the operation will be described in connection with the processing program 1.

The first step of the processing program 1 includes the instruction "a Begin loop" and "EOF mark". This signifies the repetition of process similar to the FOR-NEXT statements in BASIC language or the DO loop in other languages.

The next step "/Read I" is an instruction for searching the definition table 2 along the IC card column for the specified data item by making reference to the relational information, and reading the contents of the data item on the IC card 3a. Through the above operation, the pertinent data items for the IC card in the input device region 2a are selected for reading, and specifically in this example the account number and balance are read out of the IC card 3a by the instruction. The symbol "/" appended at the head of instruction is to distinguish instructions which make reference to the definition table 2 from other instructions.

The processor bases the sequence of data processing on the number indicated in the symbol "o", i.e., the account number first, and the sales amount next. By changing the order of arrangement or adding information indicative of the data reading or writing position or the number of bytes of data in the relational information, the processor can recognize the boundary of account number and sales amount for the immediate access to data pertinent to the input/output device without making reference to the table.

The next step is a decision process in which if the balance read out in the preceding step is less than zero, the error process (1) proceeds. The error process (1) is to branch to another processing program 5, as shown below the processing program 1, which determines the data to be abnormal or retries the process.

Unless the preceding decision step has revealed a balance below zero, the next instruction "/Display D" is executed. This instruction searches the definition table 2 along the display column for the specified data item by making reference to the relational information and displays the contents of the item. The processor scans the display column in the input device region 2b to find marked display data items in the field 2c. These are the account number, balance, sales amount and customer's name. If data of any item has not yet read out at this time, it is displayed as blank. For other items, data are read out and stored in the areas of memory specific to them. For the account number and balance, data have already been read and stored by the previous instruction "/Read I". In consequence, the account number, balance, sales amount and customer's name are displayed on the display unit 3f by this instruction. Since the relational information does not specify the order of process for the items, the display order is in compliance with the description in the fields 2c of the definition table 2.

The next step is the instruction "/Reference F" for making reference to the file storage 3d. The processor searches the definition table 2 along the file column for data items by making reference to the relational information, and reads their contents. In this example, the item of customer's name is detected by using the account number as a key, as specified by the mark "*", and its contents are read out and written in the area of memory specific to the item. Other key information includes "F", and the processor uses the account number as a key in response to the decoding of "F".

The next step is the instruction "/Input D" which searches the definition table 2 along the keyboard column for the specified data item. The instruction reads input data which is entered on the keyboard of the subsidiary terminal 3c and stores it in the specific area of memory. The definition table 2 specifies the pertinent data item to be the sales amount, and the instruction reads the keyboard data as the sales amount and stores it in the memory.

The next instruction "/Write R" is to search the definition table 2 along the memory card column in accordance with the relational information for the specified data items and write their contents on the memory card 3. The processor detects the data items in the region 2b marked in the memory card column, and reads out their data in the specific areas of memory and write the data on the memory card 3b.

The last instruction is to determine whether or not the series of instructions are to be repeated, depending on the specifications.

As described, software is divided into a processing program including instructions which specify input/output devices and a record table in which data items are searched on the basis of an input/output device, and the definition table 2 is altered by replacing the relational information (symbol "o") which connects these variables, whereby data processing functions for input- /output devices can be established arbitrarily to meet the specifications of each terminal unit. The processing program does not need to be altered at all. Data including the definition table 2 or relational information can be entered afterward, and processing functions specific to each terminal unit can be added later.

In the above description, an instruction, e.g., "Read I", is a simple language, and in this case "I" may be an operand of instruction "Read IC Card", or the entirety of "Read I" may be an instruction.

Next, another embodiment of the invention, in which the definition table is accessed directly will be described.

A definition table 20 in FIG. 2 is designed to scan the horizontal field 21 of input/output devices by an instruction and access to data stored at an intersecting location between a device column and a row of data item. Intersecting locations made by columns of input/output devices 21 and rows of data items 22 have records of positional information for data to be read or written or to be placed. The data item rows are arranged on the address map of a memory 25 which store data.

Although the positional information stored in intersections of the definition table 20 includes various information needed for reading and writing in addition to positional information indicative of the position of data input (reading) or output (writing), the minimum necessary information is the positional information for data reading or writing. The following description generally deals with the positional information for data to be read or written, unless otherwise stated. In general, data output is the writing of data to an address assigned to an output device and data input is the reading of data from an address assigned to an input device. Therefore, in this specification, terms "reading" and "writing" are used in a broad sense inclusive of data input from an input device and data output to an output device.

The reading/writing positional information has its format different depending on each input/output device. For example, an IC card 3a employs the combination of a block address and page address to form coordinate information (refer to coordinates (X1, Y1) and (X2, Y2) on lines 1 and 2 of FIG. 2). A file storage 3d employs the combination of a file name and search key or field name (refer to file names A and C and field names b and a on lines 3 and 6 of FIG. 2). A memory card 3b employs reading/writing positional information on the address map alloted to it (refer to addresses Z1, Z2, Z3, etc. on lines 1 and 2 of FIG. 2), and a display unit 3f and printer 3e employ the screen coordinates, display attribute, and print position (refer to x1, y1, k1, x2, y2, etc. on lines 1 and 2 of FIG. 2).

In the definition table 20 of FIG. 2, locations 1 , 2 , 3 , etc. of data items are in 1-to-1 correspondence to storage locations 1 , 2 , 3 , etc. in the data memory 25. Accordingly, if the instruction "Read I" which makes access to the IC card, for example, is executed, the IC card column in the definition table 20 is scanned directly from top to bottom. Consequently, the instruction reaches the address information for reading the account number and the address information for reading the balance, and at the same time locations in the memory 25 for writing these data are given. As a result, by merely getting positional information at intersections in the definition table 20, the account number and balance are read out of the IC card 3a and stored in the corresponding locations in the memory 25.

Similarly, when the instruction "Write R" which writes data on a memory card is executed, it scans the memory card column in the definition table 20 and the locations in the memory 25 to read out the account number, balance, sales amount and customer's name from the intersecting record areas on the card, and at the same time read out data at addresses for the data items in the memory 25 and record the data sequentially on the memory card 3b. The read/write operations do not take place for fields without writing positional information, the presence or absence of writing positional information are equivalent to the flag information in the preceding embodiment.

FIG. 3 is a specific example of the data format 30 of the data item row in the definition table 20. The first field 30a is to set the name of data item. Such rows of record areas are allocated in the definition table 2 in the predetermined order. For example, the data item row of sales amount is placed at the third position from the top in the definition table 2. The latter section of the field 30a is used to set various definition information such as the condition of processing.

The next field 30b, is alloted to the subsidiary terminal unit 3c, in which are recorded the input sequence data for the keyboard or the like. The next field 30c is alloted to the display unit 3f, which is used as an input device in this example. Data positional information recorded in this field include the page, cursor position, starting line and column, and display attribute.

The next field 30d is alloted to the IC card 3a in FIG. 1, and it records reading coordinates as access information. The next field 30e is alloted to a RAM, and RAM address information is recorded. The next field 30f is provided for reading data in the file storage 3d, and it records sequentially the file name, field name, field length, and search condition. The last field 30g assigned to an input device is used to record the line number and condition of use in receiving data through the line.

These are the fields for input devices, and are followed by the fields for output devices. The first field 30i is to record the coordinates of IC card 3a for writing, the next field 30j is to record the RAM address for writing, and the next field 30k is to record the print position of the printer 3d in which printing information including the output sequence, print length, print start position and attribute are placed. The field 30l is used in writing data to the file storage 3d, and it contains the file name, field name, field length and condition of search as in the preceding field 30g. The last field 30m is for the line 3g, and it records line number and condition of use for data transmission over the line. Indicated by 30n is a spare field.

Rows of data items in compliance with the format 30 are stored as data in the memory to form the 2-dimensional definition table 20 shown in FIG. 2. Data items can be added sequentially at the end of contents. Forming the definition table in a 2-dimensional structure, with one variable being input/output devices, data transaction can be determined from an input/output device and its relational information with respect to data items. Forming the definition table in a 2-dimensional structure, with one series of fields being input/output devices, data transaction can be determined from an input/output device and its relational information with respect to data items. It clarifies the data movement including the data source and data destination. By entering the positional information of the format 30 through an external device, such as a keyboard, display unit or IC card, data input/output operation is carried out very easily by merely setting the positional information in the field for the intended input/output device.

Alternation of the definition table is done through an external storage medium such as an optical card or floppy disk, and it becomes possible for a definition table produced in one information processing system to implement data transaction in the same condition in other similar system.

Although the embodiments have been described mainly for the treatment of data on the IC card, this invention is not confined to IC cards, but it is applicable to various kinds of information media. Data items pertinent to an input/output device connected to the information processing system are selected for processing by a device-dependent instruction.

Data items are not confined to be expressed in a matrix-like table, but 2-stage record tables may be arranged to achieve the same effect. A storage area may be partitioned into a series of fields so that a data item is searched in a sequential manner.

Input/output devices concerned with this invention include IC cards, memory cards, memory cartridges (memory packs), optical disks, optical cards, and CD-ROMs, in addition to ordinary input and output devices.

As will be appreciated from the above description of this invention, a 2-dimensional record table having series of device fields and data item fields is used to record their relational information at intersecting areas so that data items are accessed correspondingly to an input or output device in accordance with the relational information, whereby instructions can be independent of data items. As a result, the processing program can be prepared at the device level to the exclusion of data items, and the content of processing can readily be altered without the need of significant change in the program or without the need of any change, but by merely replacing the record table or rewriting the relational information.

In consequence, processing functions which meet various specifications can be accomplished by merely changing the input/output devices and data items in the record table. This enables terminal units to have processing functions which comply with individual specifications, while being operated under the software which is virtually common to every terminal unit.

I claim:

1. An information processing system comprising:
    an integrated circuit card terminal device including a processor, a memory, a keyboard and an IC card reader and writer, said processor being connected to said memory, said keyboard and said IC card reader and writer;
    said memory having stored therein;
    a 2-dimensional table having input and output device fields corresponding to input or output devices respectively, data item fields corresponding to data items, and intersecting recording areas, corresponding to storage areas of said memory, at intersections of said input or output device fields and said data item fields, and said processor having means for processing a program having instructions prepared in correspondence to said input or output devices;
    wherein said intersecting recording areas corresponding to said storage areas of said memory have stored therein relational information which links each input or output device with said data items; and
    wherein one of said instructions when executed by said processor causes means in said processor to access a device field of said 2-dimensional table to obtain relational information which specifies one or more data items pertinent to a device corresponding to said device field thereby causing said processing program to perform a process on one or more data items linked to said device by said relational information.

2. An information processing system according to claim 1, wherein said relational information comprises:
    positional information which indicates data reading positions for input devices or data writing positions for output devices, said instruction making access to a corresponding input or output device field so as to obtain pertinent data item(s) and said positional information.

3. An information processing system according to claim 1, wherein 2-dimensional table or relational information is obtained from a device external of said system and is stored in said memory.

4. An information processing system according to claim 2, wherein 2-dimensional table or positional information is obtained from a device external of said system and is stored in said memory.

5. An information processing system according to claim 3, wherein said data items comprises:
    items which are subjected to input by input devices or items which are subjected to output by output devices,, said relational information stored at intersecting areas of said 2-dimensional table including flag information which indicates a link between said input or output devices and one or more data items.

6. An information processing system according to claim 1, wherein said 2-dimensional table or relational information is replaced using a 2-dimensional table or relational information stored on an IC card.

7. An information processing system according to claim 2, wherein said 2-dimensional table or positional information is replaced using a 2-dimensional table or positional information stored on an IC card.

8. An input/output information processing system comprising:
    an integrated circuit card terminal device including a processor, a memory, a keyboard and an IC card reader and writer, said processor being connected to said memory, said keyboard and said IC card reader and writer;
    said memory having stored therein
    a recording table having positional information recording areas, corresponding to storage areas of said memory, for storing, in correspondence to a plurality of devices including input devices and output devices, data items that are the object of input and output processing, and said processor having means for processing a program having instructions, prepared in correspondence to said input and output devices, said instructions when executed by said processor causes means in said processor to access positional information;
    recorded selectively in said positional information recording areas of said recording table; and
    wherein said means for processing said program causes means in said processor to perform an input- /output process for data of said data items in compliance with said instruction.

9. An input/output information processing system according to claim 8, wherein:
said recording table includes fields of input and output devices corresponding to columns, and fields of data items corresponding to rows forming a 2-dimensional table so that said positional information recording areas are arranged in correspondence to said storage areas of said memory at intersections of said columns and rows, and
said instructions cause means in said processor to access an input or output device field scanning intersecting areas vertically thereby reading out positional information.

10. An input/output information processing system according to claim 8, wherein said recording table or positional information is entered by means of an external storage medium such as an IC card.

* * * * *